(12) United States Patent
Wang et al.

(10) Patent No.: US 11,259,391 B2
(45) Date of Patent: Feb. 22, 2022

(54) METHOD AND SYSTEM FOR CONTROLLING DISPLAY CONDITION WHICH IS PRE-WRITTEN INTO PASSIVE LIGHT BOARD BY MOBILE DEVICE

(71) Applicants: GENERAL LUMINAIRE CO., LTD., Taipei (TW); GENERAL LUMINAIRE (KUNSHAN) CO., LTD., Kunshan (CN); GENERAL LUMINAIRE (SHANGHAI) CO., LTD., Shanghai (CN)

(72) Inventors: Yung-Hong Wang, Taipei (TW); Brian A Cook, Shanghai (CN); Chuan-Zhu Pan, Shanghai (CN); Qin Zhou, Shanghai (CN)

(*) Notice: Subject to any disclaimer, the term of this patent is extended or adjusted under 35 U.S.C. 154(b) by 91 days.

(21) Appl. No.: 16/929,128

(22) Filed: Jul. 15, 2020

(65) Prior Publication Data

US 2022/0022307 A1 Jan. 20, 2022

(51) Int. Cl.
| | |
|---|---|
| *H05B 47/19* | (2020.01) |
| *H05B 45/10* | (2020.01) |
| *G09G 5/10* | (2006.01) |
| *G09F 9/33* | (2006.01) |
| *H04W 12/68* | (2021.01) |
| *H05B 45/20* | (2020.01) |
| *G09F 13/22* | (2006.01) |
| *H04B 5/00* | (2006.01) |

(52) U.S. Cl.
CPC ............. *H05B 47/19* (2020.01); *G09F 9/33* (2013.01); *G09F 13/22* (2013.01); *G09G 5/10* (2013.01); *H04B 5/00* (2013.01); *H04W 12/68* (2021.01); *H05B 45/10* (2020.01); *H05B 45/20* (2020.01); *G09F 2013/222* (2013.01); *G09G 2354/00* (2013.01); *G09G 2370/06* (2013.01)

(58) Field of Classification Search
CPC .......... H04B 5/00; H05B 45/10; H05B 45/20; H05B 47/19; G09F 9/33; G09F 913/04; G09F 913/22; G09F 2013/222; G09G 5/10; G09G 2354/00; G09G 2370/06; H04W 12/68
See application file for complete search history.

(56) References Cited

U.S. PATENT DOCUMENTS

| | | | |
|---|---|---|---|
| 9,565,744 B2* | 2/2017 | Lai | H05B 47/19 |
| 10,813,428 B1* | 10/2020 | Ansell | A45F 3/04 |
| 2014/0128941 A1* | 5/2014 | Williams | H05B 45/46 |
| | | | 607/88 |

(Continued)

*Primary Examiner* — Abdullah A Riyami
*Assistant Examiner* — Syed M Kaiser

(57) ABSTRACT

Disclosed are a method and system for controlling a display condition which is pre-written into a passive light board by a mobile device. A display status is pre-written into a passive light board which is not powered by electricity before, and a control application program loaded into the mobile device is provided for a user to input a brightness parameter and a color temperature parameter. The light board which is not powered by electricity before can carry out the presetting of the display condition, and related manufacturers can set the light boards quickly and easily after the light boards exit the factory, and the light boards can display according to the conditions in compliance with the brightness parameter and the color temperature parameter after the light boards are powered on.

18 Claims, 12 Drawing Sheets

(56) References Cited

U.S. PATENT DOCUMENTS

2015/0296598 A1* 10/2015 Haid .................... H05B 45/382
  315/291
2015/0341969 A1* 11/2015 Brochu .................. G06F 8/658
  717/168

* cited by examiner

METHOD AND SYSTEM FOR CONTROLLING DISPLAY CONDITION WHICH IS PRE-WRITTEN INTO PASSIVE LIGHT BOARD BY MOBILE DEVICE

BACKGROUND

Technical Field

The present disclosure generally relates to the field of lighting products. More particularly, the present disclosure relates to a method and system for controlling a display condition which is pre-written into a passive light board by a mobile device, wherein the mobile device is provided for pre-writing the display condition to a passive light board which has not been powered by electricity before, so as to facilitate the light board to display a light according to the pre-set condition when the light board is powered on and also to facilitate manufacturers or lamp installers to make related adjustments.

Description of Related Art

LED is a common light source used extensively in various kinds of luminous products nowadays, and LED light board is one of the products manufactured by light board manufacturers and a circuit board having a plurality of LED components. After exiting the factory, the manufactured LED light board can be combined with other necessary electrical components or modules to produce a lamp.

In the early-stage development of the LED light board, the color temperature of the LED light cannot be changed, so that if there is any change of the market specification, lamp manufacturers will have the issue of unable to sell the existing LED light boards and encounter a stockpiling problem, and the lamp manufacturers will have to restock new LED light boards to meet the market requirement, and all these incur possible economic risk and loss. As to consumers, the purchased LED lamp having an LED light board with a fixed color temperature can just provide limited lighting modes, since its color temperature cannot be changed. Such LED lamp fails to meet factory requirements or special situations and causes inconvenience of use.

To overcome the aforementioned drawbacks, some manufacturers introduced a lamp product with a changeable color temperature, but the color temperature of such lamp can only be adjusted when the lamp is powered on. In other words, a lamp manufacturer or an interior decorator cannot adjust the LED lamp to a desired status according to an end-user requirement in advance and has to wait till all lamps are set and powered on before carrying out the adjustment and confirming the display status of the lamp. If the color temperature is not the desired one, then the lamp manufacturer or interior decorator will have to install the lamps one by one again and repeated the foregoing steps or let the end-users adjust the lamps according to a predetermined layout, and thus causing tremendous inconvenience to the end-users. On the other hand, the development of the lamp products creates various complicated and difficult ways to make related adjustments. For example, it is necessary to install a complex control system or device which incurs an additional high installation cost and requires a specific control method, or it is necessary to buy a remote control for each lamp in order to control the lamps one by one after they are powered on. Of course, it is good to allow the end-users to adjust the color temperature of the lamp, but if the operation of the application is not user-friendly, such operation will still cause inconvenience to users during application.

In view of the aforementioned drawbacks of the conventional LED lamps, the discloser of the present disclosure provided a method and system for controlling a display condition which is pre-written into a passive light board by a mobile device, in hope of giving a better and more convenient solution for the light output control.

SUMMARY

Therefore, it is a primary objective of the present disclosure to provide a method and system for controlling a display condition which is pre-written into a passive light board by a mobile device, and the method and system perform an operation of pre-writing a display condition to a passive light board which has not been powered by electricity before, so as to facilitate manufacturers or lamp installers to pre-set a desired display status of the passive light board quickly and conveniently. After the power-on, the passive light board emits light according to the pre-written setting condition, and this disclosure provides a brand new light board display control mode for the manufacturers, the lamp installers and even the end-users.

To achieve the aforementioned and other objectives, the present disclosure provides a method for controlling a display condition which is pre-written into a passive light board by a mobile device, and the method comprises the steps of: providing at least one passive light board, wherein the passive light board comprises a microcontroller, a communication unit, a first LED circuit and a second LED circuit, and the microcontroller and the communication unit are electrically coupled to each other; starting a control application program loaded into the mobile device; inputting a brightness parameter from a display interface of the control application program, wherein the brightness parameter is obtained from a selection of a first operational gesture received by the control application program, and the mobile device has a backlight source that synchronously changes its display brightness by applying the first operational gesture through a backlight source adjustment unit of the control application program and stays at the display brightness corresponding to the brightness parameter after the brightness parameter is selected; inputting a color temperature parameter by the control application program, wherein the color temperature parameter is obtained from a selection of a second operational gesture received by the control application program, and the backlight source of the mobile device synchronously changes its color temperature of display according to the second operational gesture through the backlight source adjustment unit of the control application program and stays at the color temperature corresponding to the color temperature parameter after the color temperature parameter is selected; and placing the mobile device near the passive light board, so that the mobile device and the communication unit form a near field communication connection to pre-write the brightness parameter and the color temperature parameter into the microcontroller; so as to pre-write a display status into the passive light board which has not been powered on, and after the passive light board has installed a driver electrically coupled to the microcontroller, the first LED circuit and the second LED circuit, the microcontroller reads and computes the brightness parameter and the color temperature parameter to generate an execution instruction, and then sends the execution instruction to the driver, so that the driver drives the first LED circuit and the second LED circuit according to the execution instruction to let the passive light board display a light in compliance with the conditions of the brightness parameter and the color temperature parameter. Therefore, the users can operate the mobile device almost intuitively and pre-write information into the passive light board which is not powered by electricity before, so as to improve the convenience of controlling the light output and bring tremendous convenience to indoor lamp decorators, electrical technicians or interior decorator for the setting and adjustment of the lamps.

To achieve the aforementioned and other objectives, the present disclosure provides a system for controlling a display condition which is pre-written into a passive light board by a mobile device, and the system comprises: at least one passive light board, having a microcontroller, a communication unit, a first LED circuit and a second LED circuit, and the microcontroller and the communication unit being electrically coupled to each other; and a control application program, loaded into the mobile device, and comprising a display interface and a backlight source adjustment unit telecommunicatively coupled to each other, and the display interface being provided for a user to input a brightness parameter and a color temperature parameter into the control application program, wherein the brightness parameter is obtained from a selection of a first operational gesture received by the control application program, and a display brightness of a backlight source of the mobile device synchronously changes according to the first operational gesture through the backlight source adjustment unit and stays at the display brightness corresponding to the brightness parameter after the brightness parameter is selected; the color temperature parameter is obtained from a selection of a second operational gesture received by the control application program, and a backlight source of the mobile device synchronously changes its color temperature through the backlight source adjustment unit and stays at the color temperature corresponding to the color temperature parameter after the color temperature parameter is selected; and when the mobile device is near the passive light board, the mobile device and the communication unit form a near field communication connection to pre-write the brightness parameter and the color temperature parameter into the microcontroller; thereby, the passive light board which is not powered by electricity before carries out the pre-writing of the display status, and after the passive light board is installed with a driver electrically coupled to the microcontroller, the first LED circuit and the second LED circuit, the microcontroller reads and computes the brightness parameter and the color temperature parameter to generate an execution instruction, and then sends the execution instruction to the driver, so that the driver drives the first LED circuit and the second LED circuit according to the execution instruction to let the passive light board display a light in compliance with the conditions of the brightness parameter and the color temperature parameter.

In the two preferred embodiments described above, the first operational gesture is an up-and-down slide and the second operational gesture is a left-and-right slide; or the first operational gesture is a left-and-right slide and the second operational gesture is an up-and-down slide, so that the users can pre-write settings intuitively and easily.

In another embodiment, the control application program has a plurality of brightness options and a plurality of color temperature options provided for the users to select any one of the brightness options and any one of the color temperature options by the first operational gesture and the second operational gesture respectively, so that the control application program obtains the brightness parameter and the color temperature parameter, wherein the control application program can have a plurality of options for pre-setting the brightness and color temperature to facilitate the users to select the required color temperature and brightness conditions quickly. In a preferred embodiment, the brightness options are 25%, 50%, 75% and 100%, and the color temperature options are 2700K, 3000K, 3500K, 4000K, 4500K and 5000K.

Further, after the brightness parameter and the color temperature parameter are pre-written into the microcontroller, the mobile device generates a vibration alert or a sound alert to let the users know about the completion of the setting.

To provide set status information to the users simply and easily, the display interface can synchronously display any one of the brightness options and any one of the color temperature options, and when the users applies the first operational sliding gesture and the second operational sliding gesture on the display interface, the brightness option and the color temperature option are switched accordingly.

Further, if there is a plurality of passive light boards, the communication units of the passive light boards are telecommunicatively coupled to each other, so that after any one of the passive light boards is prewritten with the brightness parameter and the color temperature parameter, the brightness parameter and the color temperature parameter are sent to the microcontroller of the remaining passive light boards synchronously by the communication unit. Therefore, after any one of the passive light boards is set up, the passive light boards are linked automatically to achieve the effect of synchronously setting the light output condition for all light boards by a single setting, which is similar to the effect of a light infection setting.

Preferably, the first LED circuit has a plurality of first LEDs, and the second LED circuit has a plurality of second LEDs, and the first LEDs and the second LEDs have different light colors, and the first LEDs and the second LEDs are arranged in series respectively. The control method and system of the present disclosure can also pre-write the light output condition into a passive light board embedded with LEDs.

In summation of the description above, the method and system for controlling a display condition which is pre-written into a passive light board by a mobile device in accordance with the present disclosure use a mobile device to pre-write the desired display condition into a passive light board which is not powered by electricity before according to requirements quickly and easily, so to provide tremendous convenience to the LED lamp manufacturers, interior decorators, lamp installers, and even end-users. Compared with the prior art having a mechanism that receives the control information to adjust the light output status of the lamps only when the light board is powered on, the present disclosure provides a totally different control solution to effectively improve the convenience and speed of the light output control and just requires the users to perform a simple and easy operation in order to set up the lamps according to their desired display status.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
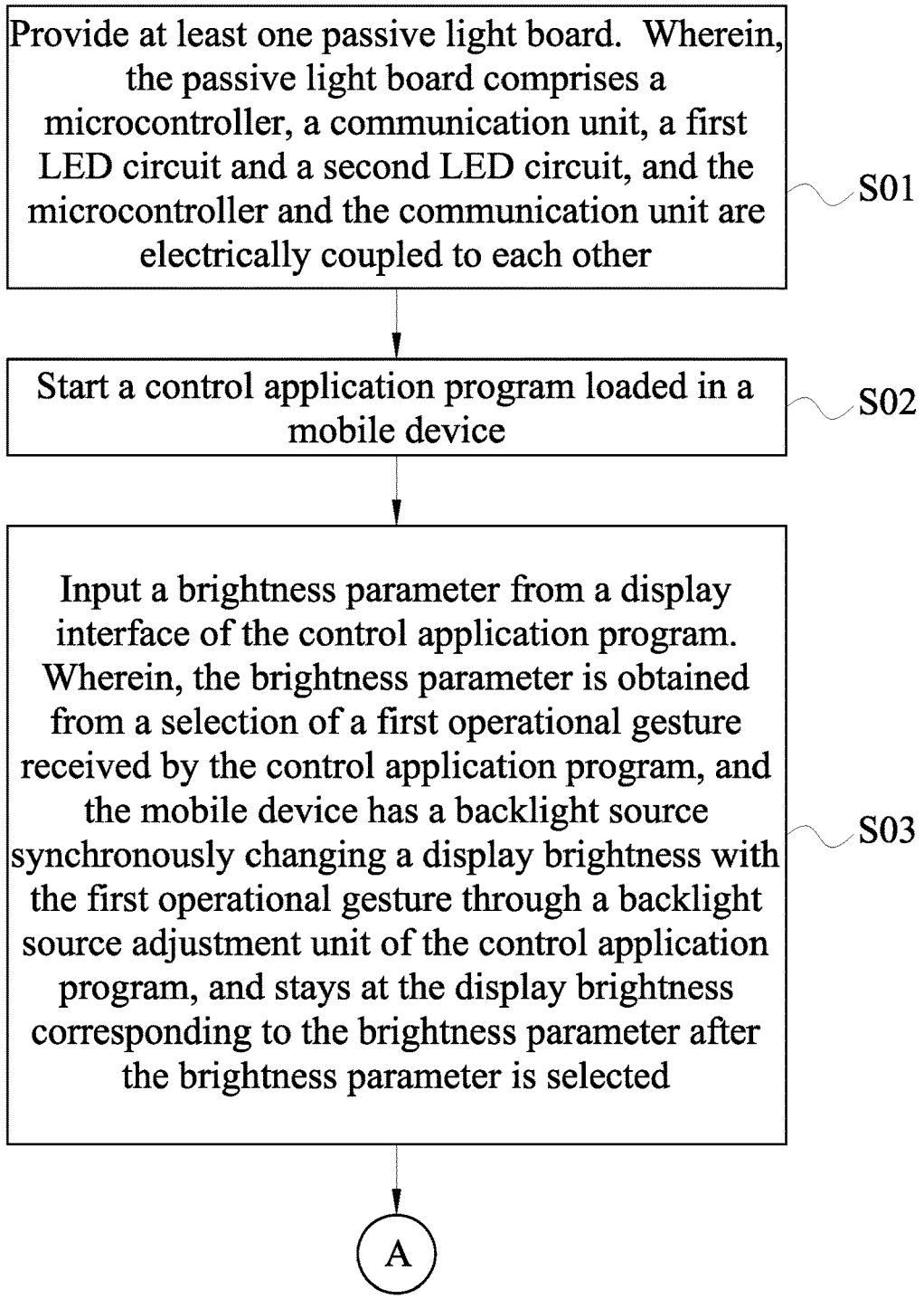
FIG. 1A is a first part of a flow chart of a method in accordance with a preferred embodiment of the present disclosure.
Figure 1B:
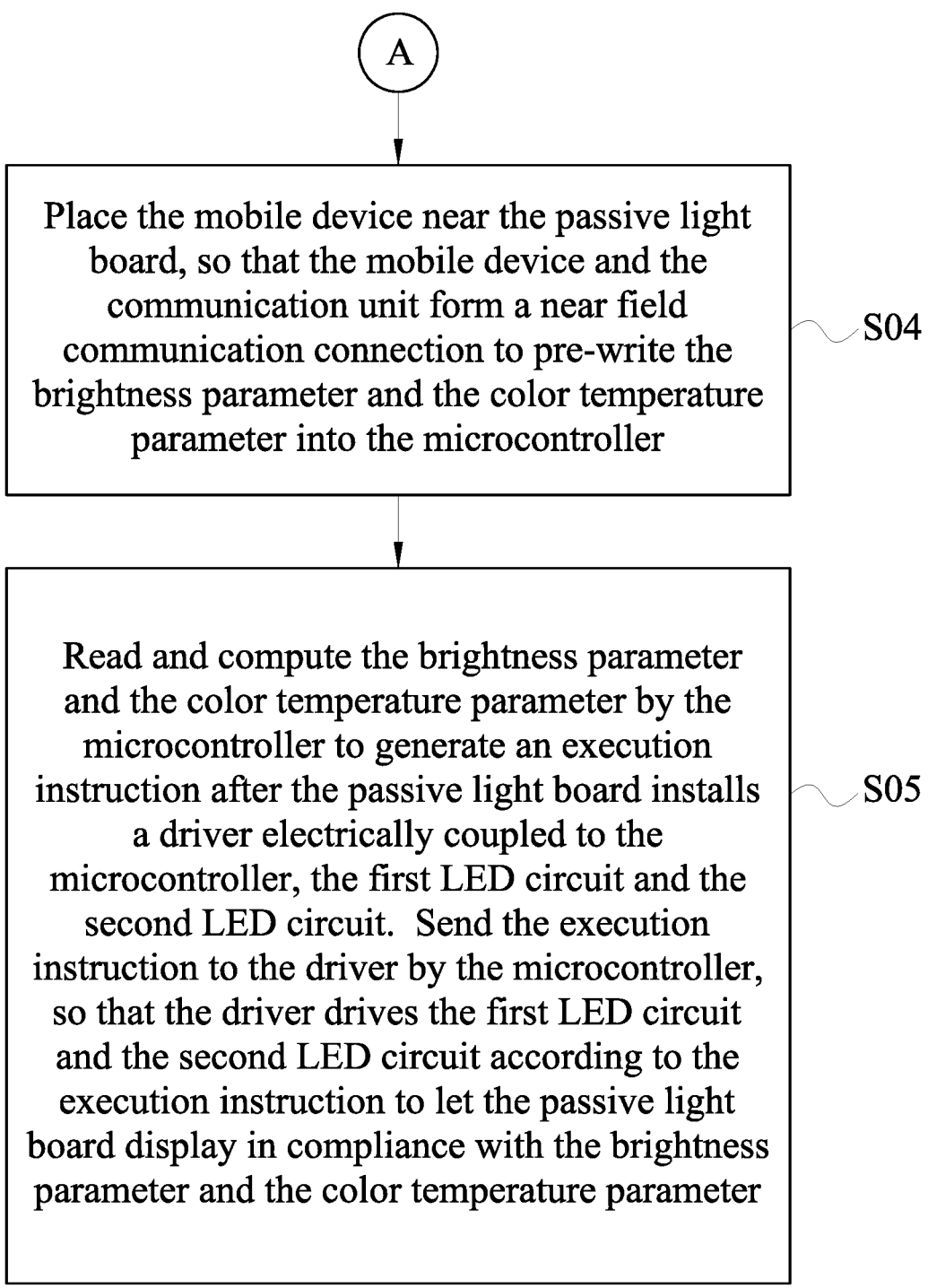
FIG. 1B is a second part of a flow chart of a method in accordance with a preferred embodiment of the present disclosure.
Figure 2:
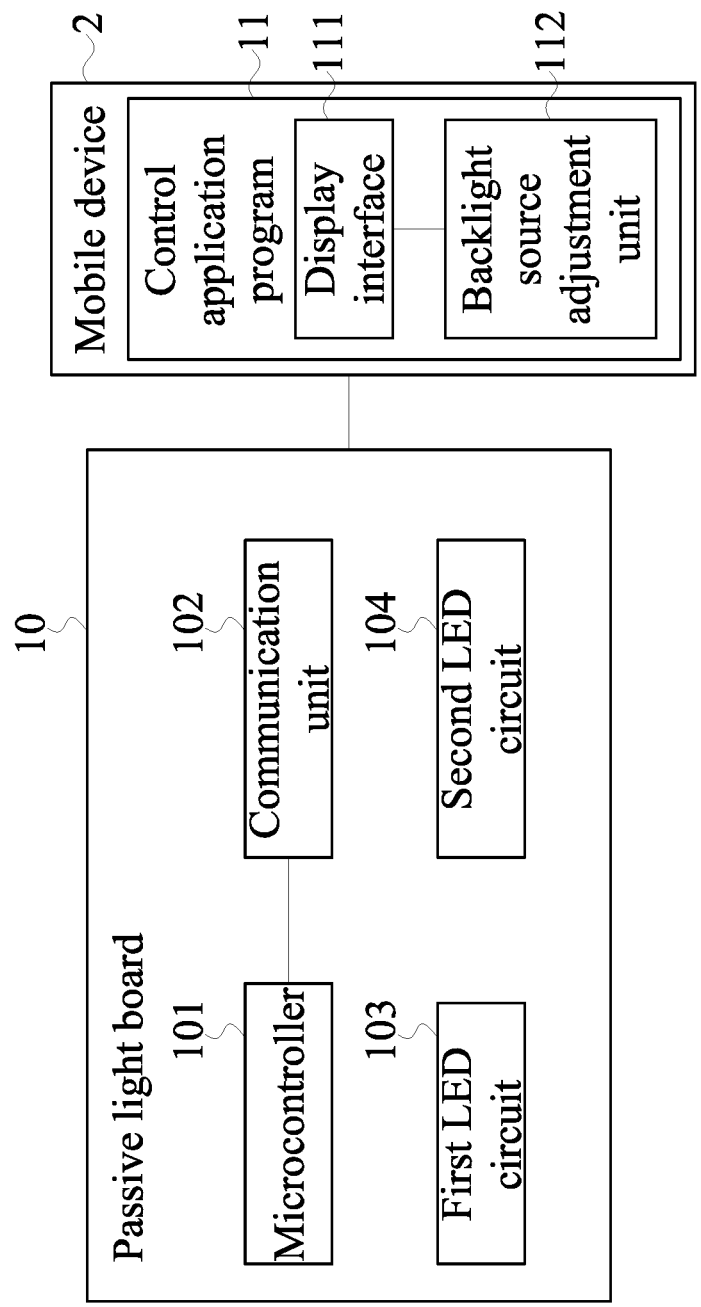
FIG. 2 is a schematic block diagram of a system in accordance with a preferred embodiment of the present disclosure.
Figure 3:
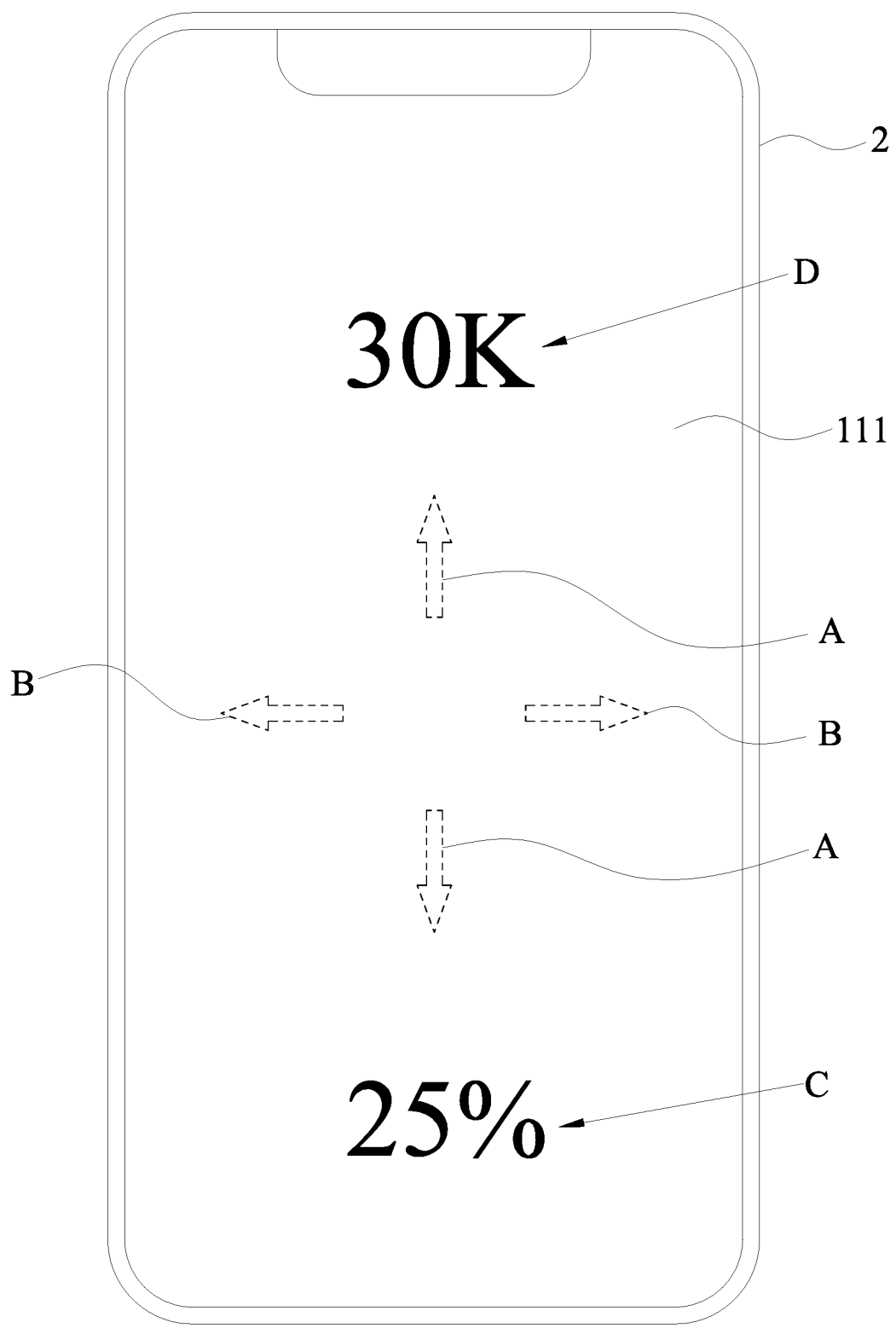
FIG. 3 is a schematic view showing the operation of a control application program of a system in accordance with a preferred embodiment of the present disclosure.

In view of the aforementioned drawbacks of the conventional lamp products with poor control and inconvenient adjustment of the light output status, the discloser of the present discloser provides a method and system for controlling a display condition which is pre-written into a passive light board by a mobile device to allow users to control the light boards conveniently in different occasions, and to pre-write a display condition into a passive light board which is not powered by electricity before. Therefore, the focus of the present disclosure resides on that the display condition can be pre-written into the passive light board which has not been powered by electricity before. After the passive light board is powered on, the passive light board can display a light in a luminous state according to the pre-written condition. Therefore, the technology of this disclosure is totally different from that requiring the setting to be done when the light board is powered on. In addition, the control method and system in accordance with the present disclosure allow the light board (before being manufactured into a lamp or electrically conducted) to carry out the setting of the display condition. In addition, a mobile device such as cellphone or tablet computer can be used to preview the display status to achieve the effect of significantly improving the performance and convenience of setting the light boards. The technical characteristics of the present disclosure will become clearer in light of the following detailed description of an illustrative embodiment of this disclosure described in connection with the related drawings. With reference to FIGS. 1A, 1B, 2 and 3 for the first and second parts of a flow chart of a method, a schematic block diagram of a system, and a schematic view showing the operation of a control application program in accordance with a preferred embodiment of the present disclosure respectively, the method for controlling a display condition which is pre-written into a passive light board by a mobile device is first described as follows.

The control method comprises the following steps:

S01: Provide at least one passive light board 10, wherein the passive light board 10 comprises a microcontroller 101, a communication unit 102, a first LED circuit 103 and a second LED circuit 104, and the microcontroller 101 and the communication unit 102 are electrically coupled to each other. Wherein, the passive light board 10 refers to a circuit board which is not powered by electricity before, and the passive light board comprises the microcontroller 101 and the communication unit 102 installed thereon and used as media for transmitting and storing information, and the first LED circuit 103 and the second LED circuit 104 are provided for installing LEDs of different light colors, and this part will be described in details. Of course, the passive light board 10 can further have a third kind of LED circuits and LEDs.

S02: Start a control application program 11 loaded into a mobile device 2. After the control application program 11 is run, a brightness parameter can be inputted from a display interface 111 of the control application program 11, wherein the brightness parameter is obtained from a selection of a first operational gesture A received by the control application program 11, and the display brightness of a backlight source of the mobile device 2 synchronously changes according to the first operational gesture through a backlight source adjustment unit 112 of the control application program 11 and stays at the display brightness corresponding to the brightness parameter after the brightness parameter is selected.

S03: Input a color temperature parameter from the control application program 11, wherein the color temperature parameter is obtained from a selection of a second operational gesture B received by the control application program 11, and the backlight source of the mobile device 2 synchronously changes its color temperature according to the second operational gesture B through the backlight source adjustment unit 112 of the control application program 11, and stays at the color temperature corresponding to the color temperature parameter after the color temperature parameter is selected.

In addition to the quick and convenient way of pre-setting of the passive light board 10 by various different users, the present disclosure also has another key point of providing a more intuitive way of inputting the settings. Preferably, the first operational gesture A is an up-and-down slide and the second operational gesture B is a left-and-right slide, or the first operational gesture A is a left-and-right slide and the second operational gesture B is an up-and-down slide, so that the users can select the brightness parameter and the color temperature parameter by simple intuitive sliding. In this embodiment, the first operational gesture A is an up-and-down slide and the second operational gesture B is a left-and-right slide.

Figure 4A:
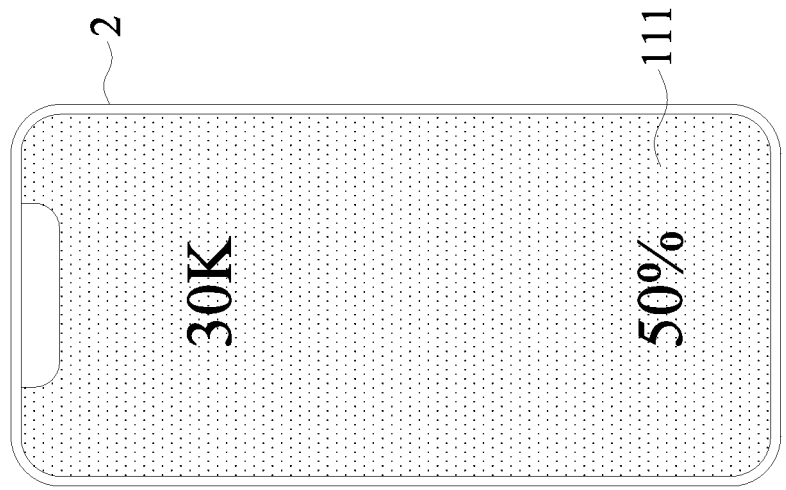
FIG. 4A is a first schematic view showing an operation of selecting a brightness parameter by applying a first operational sliding gesture on a display interface in accordance with a preferred embodiment of the present disclosure.
Figure 4A:
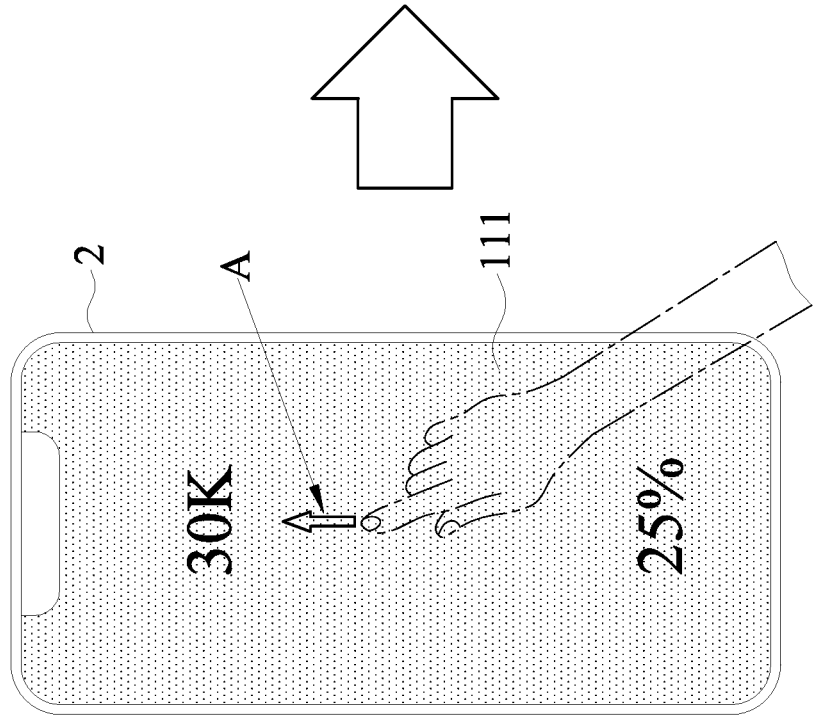
Figure 4B:
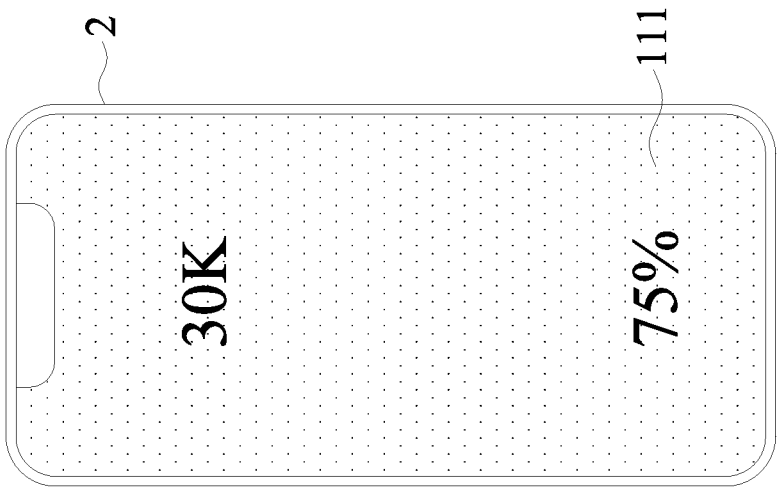
FIG. 4B is a second schematic view showing an operation of selecting a brightness parameter by applying a first operational sliding gesture on a display interface in accordance with a preferred embodiment of the present disclosure.
Figure 4B:
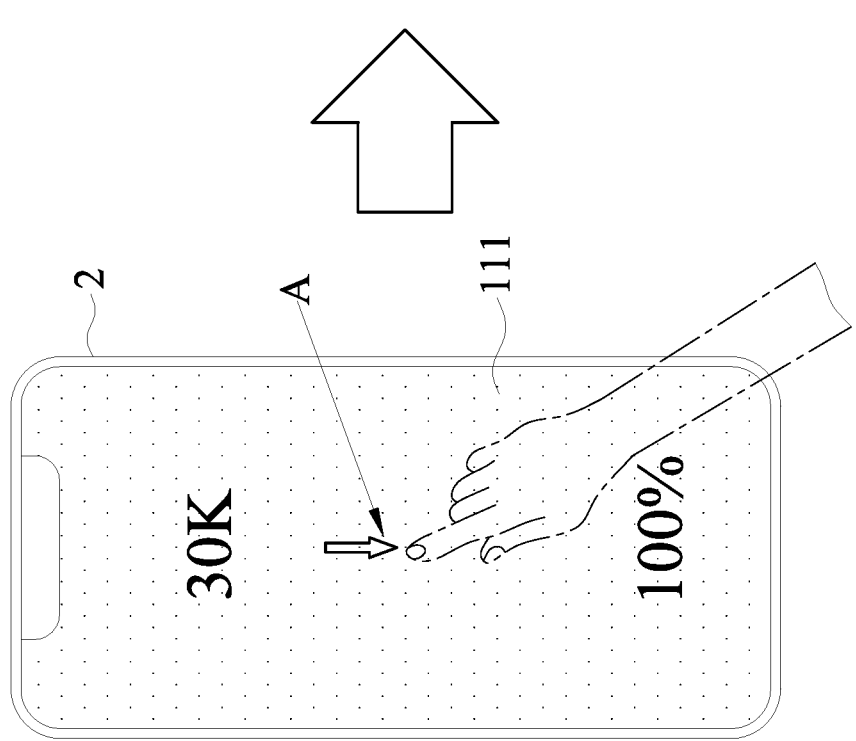
Figure 5A:
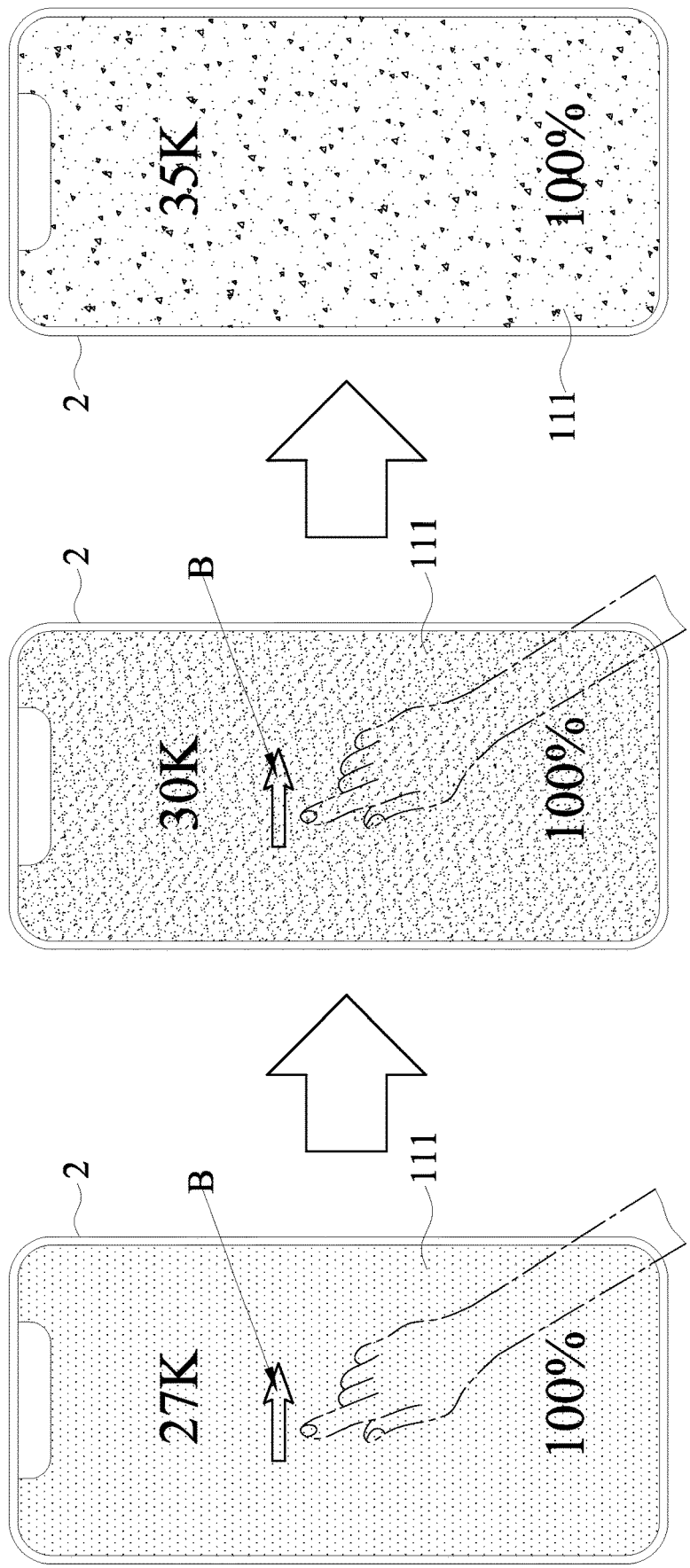
FIG. 5A is a first schematic view showing an operation of selecting a color temperature parameter by applying a second operational sliding gesture on a display interface in accordance with a preferred embodiment of the present disclosure.
Figure 5B:
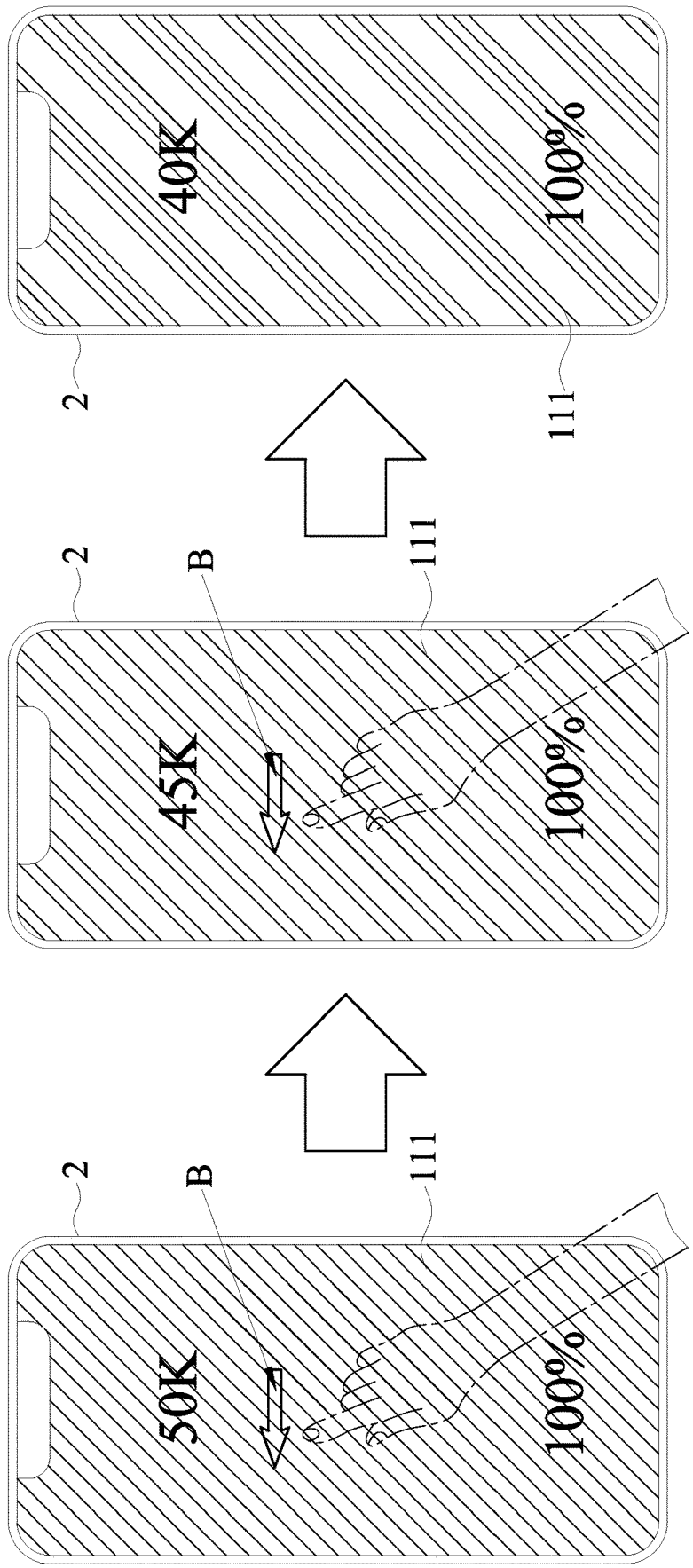
FIG. 5B is a second schematic view showing an operation of selecting a color temperature parameter by applying a second operational sliding gesture on a display interface in accordance with a preferred embodiment of the present disclosure.

With reference to FIGS. 4A-5B for the first and second schematic views showing an operation of selecting a brightness parameter by applying the first operational sliding gesture on the display interface and the first and second schematic views showing an operation of selecting a color temperature parameter by applying the second operational sliding gesture on the display interface in accordance with a preferred embodiment of the present disclosure respectively, the backlight source of the mobile device synchronously changes according to the first operational gesture and the second operational gesture of a user, and a density difference of the hatch shown in FIGS. 4A and 4B represents the change of brightness, and a different type of hatch shown in FIGS. 5A and 5B represents a change of color temperature, the hand in the figure is for illustration purpose. Specifically, when a user wants to perform a setting, the user selects and inputs the brightness parameter by applying the first operational gesture A on the display interface 111. In the meantime, the user makes an adjustment to the user's first operational gesture A, and the backlight source of the mobile device 2 will synchronously change the brightness through the backlight source adjustment unit 112 to achieve the effect of a preview setting result, so that the user can expect the passive light board 10 to emit lights with a brightness corresponding to the inputted brightness parameter after the passive light board 10 is powered on. For example, if the first operational gesture A of the user is an upward sliding on the display interface 111 as shown in FIG. 4A, the display brightness of the backlight source of the mobile device 2 will increase accordingly. On the other hand, if the first operational gesture A of the user is a downward sliding on the display interface 111, the display brightness of the backlight source of the mobile device 2 will decrease accordingly.

Similarly, the same applies to the setting of color temperature. The user inputs the color temperature parameter by applying the second operational gesture B on the display interface 111, and the backlight source of the mobile device 2 synchronously changes the color temperature of display according to the second operational gesture B of the user through the backlight source adjustment unit 112, so that the user can preview the inputted color temperature status, and accurately adjust the display to the desired color temperature. For example, if the second operational gesture B of the user applied on the display interface 111 is a rightward sliding as shown in FIG. 5A, the color temperature of the backlight source of the mobile device 2 will increase accordingly. On the other hand, if the second operational gesture B of the user applied on the display interface 111 is a leftward sliding as shown in FIG. 5B, the color temperature of the backlight source of the mobile device 2 will decrease accordingly. After the brightness parameter and the color temperature parameter are selected, the backlight source of the mobile device 2 will stay at a display status of the brightness and the color temperature corresponding to the brightness parameter and the color temperature parameter respectively, so that the user can base on these parameters to confirm the final setting and select the required lighting condition effectively, quickly, and accurately.

Figure 6:
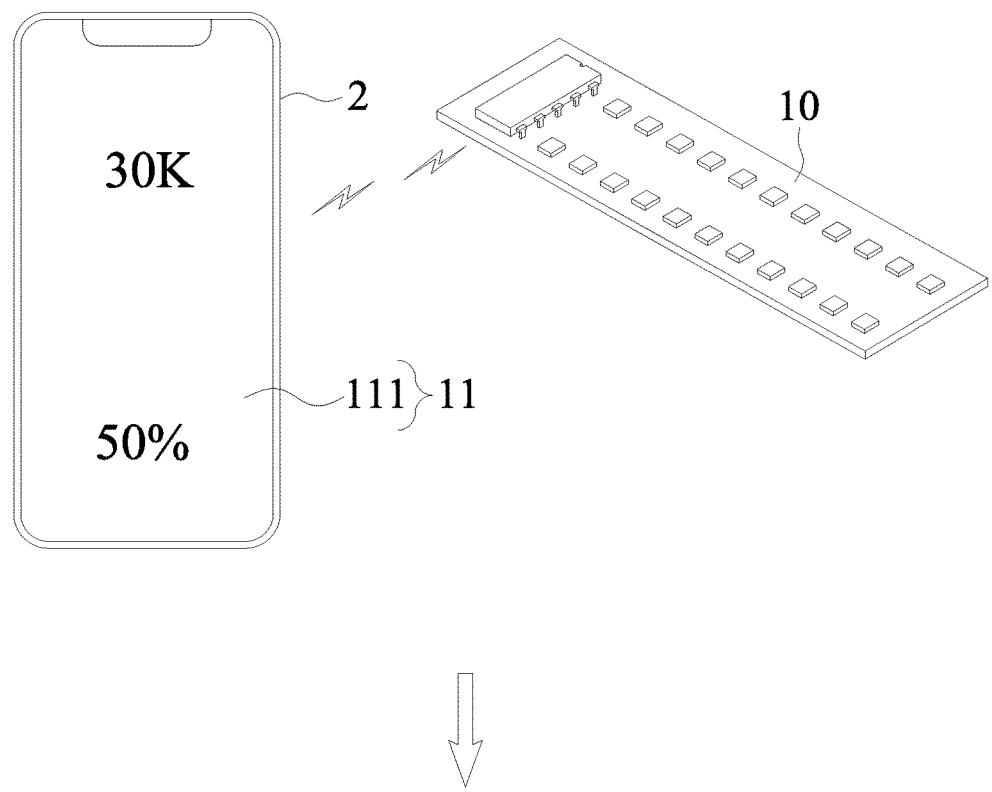
FIG. 6 is a schematic view showing an operation of pre-writing a brightness parameter and a color temperature parameter into a passive light board in accordance with a preferred embodiment of the present disclosure.
Figure 6:
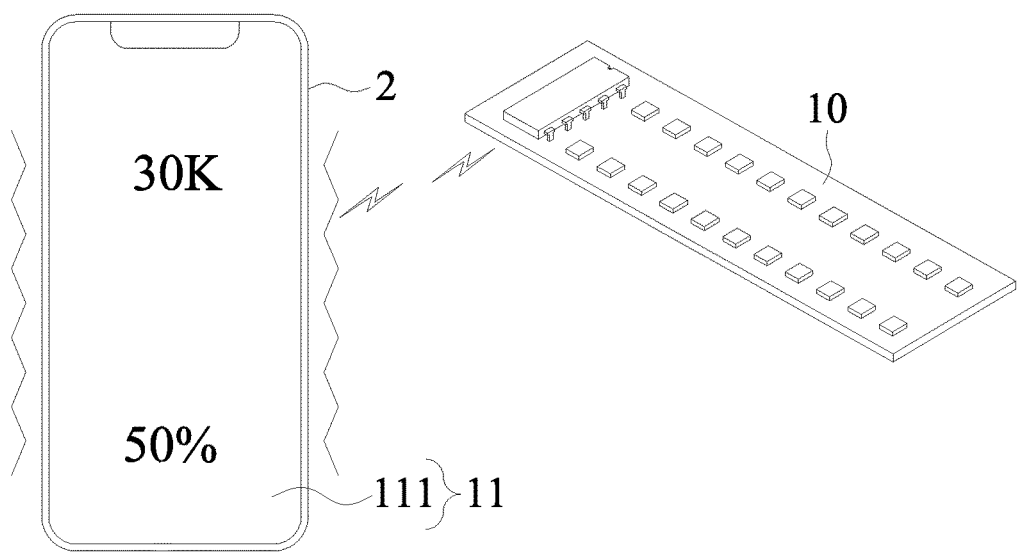

S04: Place the mobile device 2 near the passive light board 10 after the user inputs brightness parameter and the color temperature parameter from the control application program 11, so that the mobile device 2 and the communication unit 102 form a near field communication connection to pre-write the brightness parameter and the color temperature parameter into the microcontroller 101. FIG. 6 is a schematic view showing an operation in accordance with a preferred embodiment of the present disclosure of pre-writing a brightness parameter and a color temperature parameter into a passive light board.

S05: Place the mobile device 2 near the passive light board 10 after the user has finished inputting the brightness parameter and the color temperature parameter, so that the display condition can be pre-written into the microcontroller 101, and the passive light board 10 which is not powered by electricity before can perform the pre-writing of the display status. After a driver (not shown in the figure) electrically coupled to the microcontroller 101, the first LED circuit 103 and the second LED circuit 104 is installed to the passive light board 10, the microcontroller 101 reads and computes the brightness parameter and the color temperature parameter to generate an execution instruction, and then sends the execution instruction to the driver, so that the driver can drive the first LED circuit 103 and the second LED circuit 104 according to the execution instruction and the display of the passive light board 10 can comply with the conditions of the brightness parameter and the color temperature parameter.

By the aforementioned steps, this method can use the control application program 11 of an active party to transmit the brightness parameter and the color temperature parameter to the passive light board 10 of a passive party by forming a near field communication through the communication unit 102, so that the passive light board 10 which is not powered by electricity before still can receive the information of the brightness parameter and the color temperature parameter and can have the effect of pre-writing the display condition. After the passive light board 10 has installed the driver and received an electric power supply, the microcontroller 101 can read and compute the brightness parameter and the color temperature parameter to generate the execution instruction, so that the driver can drive the first LED circuit 103 and the second LED circuit 104 according to the execution instruction and drives the passive light board 10 to emit light according to the pre-written display condition. In a preferred embodiment, the microcontroller 101 stores first luminous information corresponding to the first LED circuit 103 and second luminous information corresponding to the second LED circuit 104, so that after the passive light board 10 receives the electric power supply, the microcontroller 101 combines the first luminous information, the second luminous information, the brightness parameter and the color temperature parameter for the computation to obtain the required conductive state of the first LED circuit 103 and the second LED circuit 104 in order to emit lights according to the corresponding brightness parameter and the corresponding color temperature parameter by the passive light board 10, and then the execution instruction is generated accordingly, so that the driver can adjust and control the conductive state of the first LED circuit 103 and the second LED circuit 104 according to the execution instruction.

This disclosure can pre-set the passive light board 10 which is not powered by electricity before and thus significantly improving the convenience of setting the lighting status for various different users. For example, after a manufacturer purchases the passive light board 10, the manufacturer can complete the presetting of the passive light board 10 according to a customer's requirement by the aforementioned procedure and then install the driver to the passive light board 10 and other necessary components to produce a lamp product before shipping the lamp product to the customer. After the customer powers on the lamp, the passive light board 10 will display light according to the pre-written conditions of the brightness parameter and color temperature parameter. In another application, the passive light board 10 has been assembled to produce a lamp product, and there is a need to purchase the lamp product with the passive light board 10 from the manufacture for the decoration work and the installation of lamps for the lighting in an indoor environment, an electrical technician can install the lamps one by one at predetermined positions. When the lamp is connected to Mains electricity yet, the passive light board 10 in the lamp pre-writes the brightness parameter and the color temperature parameter into the microcontroller 101 of the passive light board 10 through the control application program 11, and then the lamp installs the driver and connects to Mains electricity. After the passive light board 10 is powered on, the passive light board 10 will display light in compliance with the luminous state of the pre-written display condition. Besides improving the convenience of setting, this disclosure also provides a better safety to the operators. It is noteworthy that the objective and technology of the present disclosure resides on pre-writing the display condition to the passive light board 10 which is not powered by electricity before. Regardless of the passive light board 10 which has not been assembled into a lamp, or the passive light board 10 which has been preliminarily assembled into a lamp but not yet powered on, the present disclosure can be applied.

In FIGS. 3 to 5B, the control application program 11 can directly and freely select and adjust the required display condition according to the first operational gesture A and the second operational gesture B of the user, or the control application program 11 can set a plurality of brightness options C and a plurality of color temperature options D provided for the user to select any one of the brightness options C and any one of the color temperature options D by the first operational gesture A and the second operational gesture B respectively, so that the control application program 11 can obtain the brightness parameter and the color temperature parameter. Therefore, the user can quickly select the brightness option C and the color temperature option D by the first operational gesture A and the second operational gesture B through the built-in option settings, wherein, the brightness options C are preferably 25%, 50%, 75% and 100%, and the color temperature options D are preferably 2700K, 3000K, 3500K, 4000K, 4500K and 5000K that can fit the installation environment and the general lighting requirement.

In a preferred embodiment, the display interface 111 synchronously displays any one of the brightness options C and any one of the color temperature options D, and when the user slides the first operational gesture A and the second operational gesture B on the display interface 111, the brightness option C and the color temperature option D are switched accordingly as shown in FIGS. 3 to 5B. In other words, the display interface 111 simultaneously displays one of the brightness options C and one of the color temperature option D. When the user controls the display interface 111 with the first operational gesture A, the brightness option C is switched accordingly; and when the user controls the display interface 111 with the second operational gesture B, the color temperature option D is also switched accordingly. Therefore, the display interface 111 keeps displaying the status of one of the brightness options C and one of the color temperature options D only which allows the display interface 111 to be simpler and more concise and provides an intuitive viewing and operation feel to users. In this embodiment, the backlight source of the mobile device 2 displays light by the current brightness and color temperature statuses corresponding to the brightness option C and the color temperature option D of the display interface 111, and the brightness option C and the color temperature option D are switched with the user's gesture accordingly, and the display status of the backlight source of the mobile device 2 will also change accordingly to achieve the effect of allowing the users to preview the set statuses.

Preferably, after the user uses the mobile device 2 to set the required brightness parameter and color temperature parameter, the user places the mobile device 2 near the passive light board 10 to form a near field communication with the communication unit 102. After the brightness parameter and the color temperature parameter are pre-written into the microcontroller 101, the mobile device 2 will generate a vibration alert or a sound alert to let the user know that the passive light board 10 has completed the setting. In this embodiment, the mobile device 2 will generate the vibration alert as shown in FIG. 6. It is noteworthy that the vibration alert or the sound alert of this embodiment is provided for informing the user that the backlight source of the mobile device 2 shows the brightness and color temperature corresponding to the brightness parameter and the color temperature parameter set by the user, so that the present disclosure adopts tactile or auditory method to achieve a quick intuitive alert effect and let the user know whether or not the passive light board 10 is pre-written with the brightness parameter and the color temperature parameter.

Figure 7:
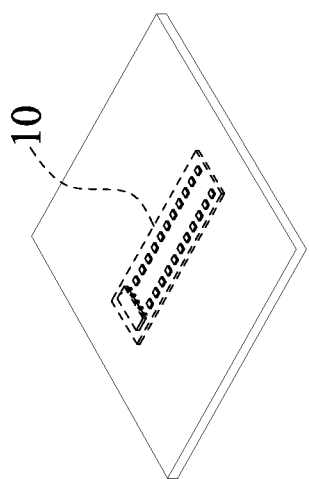
FIG. 7 is a first schematic view of an operation of a system having a plurality of passive light boards in accordance with a preferred embodiment of the present disclosure.
Figure 7:
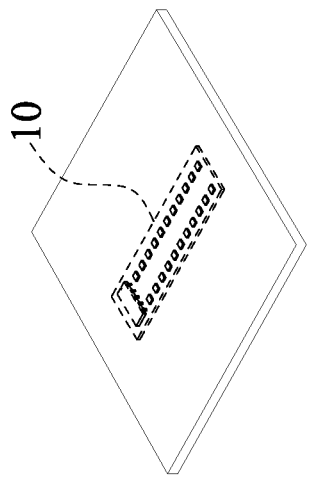
Figure 7:
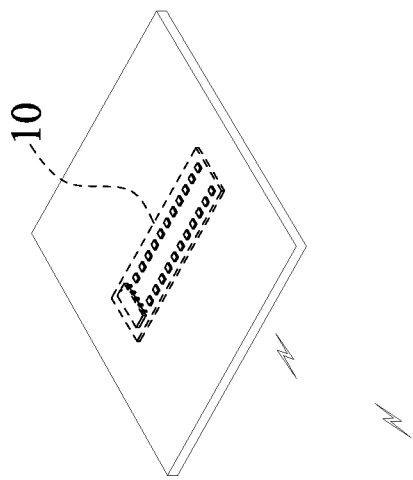
Figure 7:
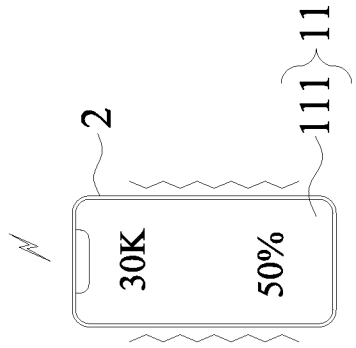
Figure 8:
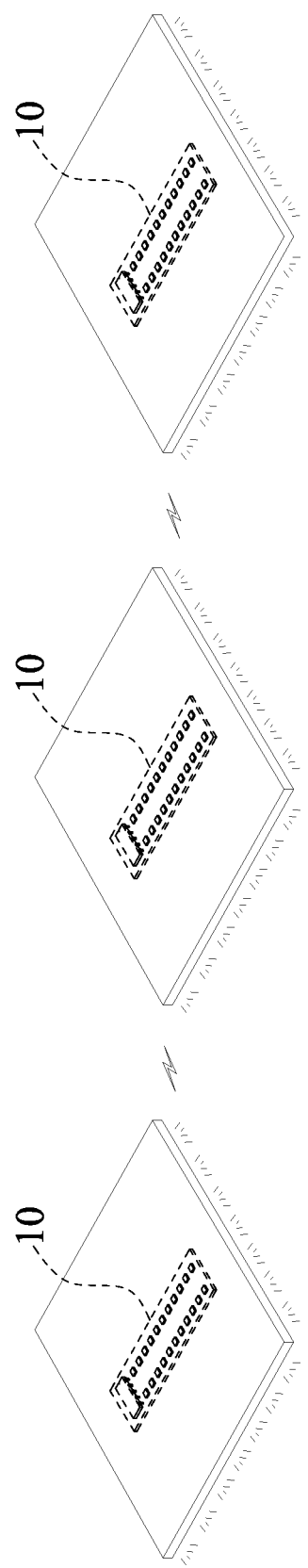
FIG. 8 is a second schematic view of an operation of a system having a plurality of passive light boards in accordance with a preferred embodiment of the present disclosure.

In practical applications, it sometimes needs to perform a pre-writing of the display condition to a plurality of passive light boards 10. Of course, it can be done by the control application program 11 to write the expected display condition into the microcontroller 101 of each of the passive light boards 10 quickly and accurately, but this disclosure provides a better solution to improve the setting efficiency. With reference to FIGS. 7 and 8 for the first and second schematic views showing an operation for a plurality of passive light boards in accordance with a preferred embodiment of the present disclosure, the communication unit 102 of the passive light board 10 are telecommunicatively coupled to each other when there is a plurality of passive light boards 10, so that after any one of the passive light boards 10 is pre-written with the brightness parameter and the color temperature parameter, the brightness parameter and the color temperature parameter are sent to the microcontrollers 101 of the remaining passive light boards 10 synchronously by the communication unit 102. Therefore, when it is necessary to set the plurality of passive light boards 10, the brightness parameter and the color temperature parameter are just written into any one of the passive light boards 10, and then after each of the passive light boards 10 receives the electric power supply, the passive light boards pre-written with the display condition can automatically send the brightness parameter and the color temperature parameter synchronously to the other passive light boards 10 through the communication unit 102 to achieve the light effect similar to an infection, so as to save the user's time required for the setting and also let each of the passive light boards 10 have the same light output status. For example, after the passive light board 10 installs a driver and receives the electric power supply, the microcontroller 101 will confirm whether or not this passive light board 10 has been set with the brightness parameter and the color temperature parameter while the passive light board is at the status of not being powered on. In the meantime, the time of setting the brightness parameter and the color temperature parameter can be found. After the confirmation of having the setting, the passive light board 10 pre-written with the display condition can automatically transmit the brightness parameter and the color temperature parameter to the other passive light boards 10 synchronously through the communication unit 102, and the other passive light boards 10 receiving the display condition can display light with the most updated set condition according to the brightness parameter and the color temperature parameter and the corresponding timestamp. Therefore, any one of the passive light boards 10 is set for several times or two or more passive light boards are set under the condition when the passive light board is not powered on, and the remaining passive light boards 10 can be ensured to have the same display condition for lighting after the passive light boards 10 are powered on. Wherein, the passive light board 10 is preliminarily assembled into a flat lamp to be installed to the ceiling as shown in FIGS. 7 and 8. In FIG. 7, after any one of the passive light boards 10 is pre-written with the display condition through the control application program 11 of the mobile device 2 and each of the passive light boards 10 is then installed with a driver and electrically conducted, the communication units 102 of the passive light boards 10 are telecommunicatively coupled to each other to synchronously transmit the brightness parameter and the color temperature parameter to the microcontrollers 101 of the remaining passive light boards 10 by the communication unit 102 as shown in FIG. 8. Now, each lamp with the passive light board 10 has the same luminous state for lighting. Of course, this is a preferred embodiment only, but the key point of the present disclosure is to set the passive light board 10 instead of limiting to the control of the assembled lamp.

Figure 9:
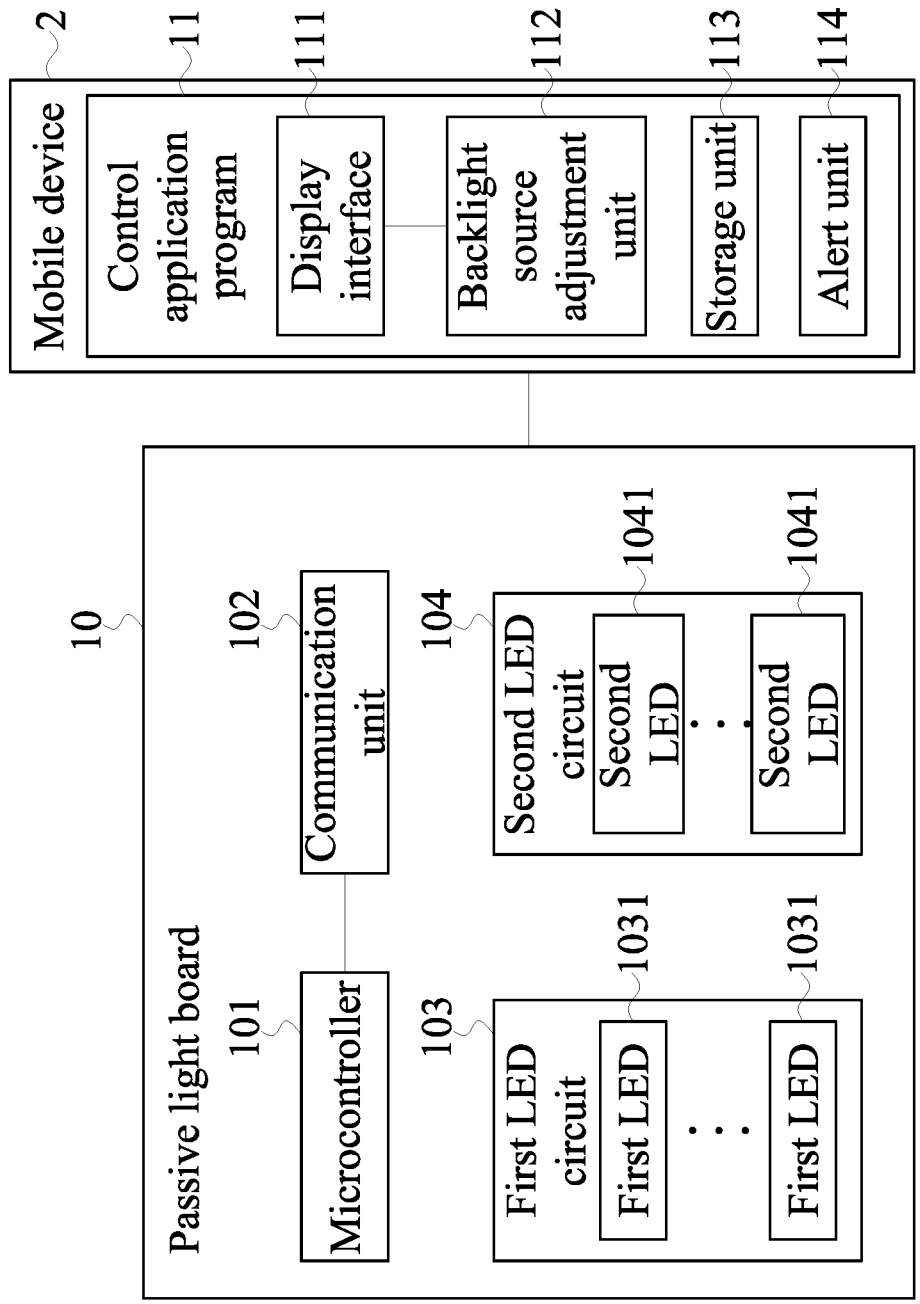
FIG. 9 is a schematic block diagram of a system in accordance with another implementation mode of a preferred embodiment of the present disclosure.

As described above, the present disclosure relates to the technology of pre-writing the display condition into the passive light board 10, wherein the passive light board 10 refers to a circuit board which has not been powered by electricity before, so that any passive light board 10 which has not been powered by electricity before is an object to be set according to the present disclosure. In practical applications, the passive light board 10 can be a light board without any embedded LED. After the display condition is pre-written into the light board, components such as LEDs and a driver are installed. With reference to FIG. 9 for a schematic block diagram of another implementation of a preferred embodiment of the present disclosure, the passive light board 10 includes the first LED circuit 103 having a plurality of first LEDs 1031 and the second LED circuit 104 having a plurality of second LEDs 1041, and the first LEDs 1031 and the second LEDs 1041 have different light colors, and the first LEDs 1031 and the second LEDs 1041 are arranged in series respectively and situated in a status without being powered by electricity before.

With reference to FIGS. 2 to 6 and the description of these figures, the present disclosure further discloses a system for controlling a display condition which is pre-written into a passive light board by a mobile device, wherein the system comprises at least one passive light board 10 and a control application program 11. The passive light board 10 comprises the microcontroller 101, the communication unit 102, the first LED circuit 103 and the second LED circuit 104, and the microcontroller 101 and the communication unit 102 are electrically coupled to each other. The passive light board 10 has the same characteristics as described above and is a light board without being powered by electricity before, and the remaining related details are the same as those described above, and thus will not be repeated The control application program 11 is loaded into the mobile device 2, and the control application program 11 comprises a display interface 111 and a backlight source adjustment unit 112, and the display interface 111 and the backlight source adjustment unit 112 are telecommunicatively coupled to each other, and the display interface 111 is provided for a user to enter a brightness parameter and a color temperature parameter to the control application program 11, wherein the brightness parameter is obtained from a selection of a first operational gesture A received by the control application program 11, and the backlight source of the mobile device 2 synchronously changes its display brightness according to the first operational gesture A by the backlight source adjustment unit 111 and stays at the display brightness corresponding to the brightness parameter after the brightness parameter is selected; the color temperature parameter is obtained from a selection of a second operational gesture B received by the control application program 11, and the backlight source of the mobile device 2 synchronously changes its color temperature according to the second operational gesture B by the backlight source adjustment unit 111 and stays at the color temperature corresponding to the color temperature parameter after the color temperature parameter is selected; when the mobile device 2 is near the passive light board 10, the mobile device 2 and the communication unit 102 form a near field communication connection to pre-write the brightness parameter and the color temperature parameter into the microcontroller 101.

Therefore, the passive light board 10 which is not powered by electricity before can be pre-written with the display condition, and after the passive light board 10 is installed with a driver (not shown in the figure) electrically coupled to the microcontroller 101, the first LED circuit 103 and the second LED circuit 104, the microcontroller 101 reads and computes the brightness parameter and the color temperature parameter to generate an execution instruction, and then sends the execution instruction to the driver, so that the driver can drive the first LED circuit 103 and the second LED circuit 104 of the passive light board 10 to emit light in compliance with the conditions of the brightness parameter and the color temperature parameter according to the execution instruction. The technical characteristics of the operation for setting the control application program 11 and pre-writing the display condition into the passive light board 10 are illustrated by FIGS. 4A-5B.

The control system can pre-write the setting of the display condition into the passive light board 10 which has not been powered by electricity before, so as to significantly improve the convenience for setting the lighting requirement for various kinds of users. Particularly to the interior decoration operators, the control system provides a novel setting mode, so that the pre-setting operation can be performed according to the desired lighting condition before the passive light board 10 is electrically conducted, and the operators no longer need to power on the passive light board 10 in order to change the passive state into the active state first, and then perform the setting. Obviously, the present disclosure can significantly improve the efficiency and convenience of the operation. Other remaining related effects and applications are the same as those described in the control method, and thus will not be repeated.

Similarly, the technical characteristics of the aforementioned control method can also be applied to the control system. For example, the control system provides a more intuitive operation for the users to set the passive light board 10 more quickly and easily. Preferably, the first operational gesture A is an up-and-down slide and the second operational gesture B is a left-and-right slide, or the first operational gesture A is a left-and-right slide and the second operational gesture B and an up-and-down slide, so that the users can simply perform a sliding operation in different directions to adjust and select the required brightness parameter and color temperature parameter.

In FIGS. 3 to 5B, the display interface 111 synchronously displays any one of the brightness options C and any one of the color temperature options D, and when the user slides with the first operational gesture A and the second operational gesture B, the brightness option C and the color temperature option D are switched accordingly. Therefore, this disclosure provides a simpler and more concise operation interface to the users, while allowing the users to quickly and clearly know about the current brightness option C and color temperature option D. When the users switch the brightness option C and the color temperature option D by the first operational gesture A and the second operational gesture B, the backlight source of the mobile device 2 is controlled by the backlight source adjustment unit 111 to automatically display the corresponding brightness and color temperature status according to different brightness options C and color temperature options D and allow the users to preview the light output status of the passive light board 10 later while selecting the parameters.

To inform the user about the set status of the passive light board 10, the control application program 11 further comprises an alert unit 114, telecommunicatively coupled to the communication unit 102, so that after the brightness parameter and the color temperature parameter are pre-written into the microcontroller 101, the mobile device 2 generates a vibration alert as shown in FIG. 6. Therefore, the users are informed about the setting quickly through a tactile alert. Since the preview of the brightness and color temperature status of the backlight source of the mobile device 2 already is provided timely to the users, therefore the present disclosure further uses a vibration method to let the users know whether or not the setting is completed.

When there is a plurality of passive light boards 10, the communication units 102 of the passive light board 10 are telecommunicatively coupled to each other, so that after any one of the passive light boards 10 is pre-written with the brightness parameter and the color temperature parameter, the brightness parameter and the color temperature parameter will be transmitted synchronously into the microcontrollers 101 of the remaining passive light boards 10 by the communication unit 102. Therefore, it is only necessary to write the brightness parameter and the color temperature parameter into any one of the passive light boards 10, and after each of the passive light boards 10 is powered on, the passive light boards 10 pre-written with the display condition can automatically transmit the brightness parameter and the color temperature parameter to the other passive light boards 10 synchronously through the communication unit 102, so as to significantly improve the setting efficiency. Please refer to FIGS. 7 and 8 and the corresponding description of these figures.

In FIG. 9, the control application program 11 can set a common lighting option that meets the general requirements in advance to facilitate the users to adjust and select the lighting setting quickly. For the reason above, the control application program 11 comprises a storage unit 113 for storing a plurality of brightness options C and a plurality of color temperature options D provided for the users to select any one of the brightness options C and any one of the color temperature options D by the first operational gesture A and the second operational gesture B, so that the control application program 11 can obtain the brightness parameter and the color temperature parameter. Preferably, the brightness options C are 25%, 50%, 75% and 100% respectively, and the color temperature options D are 2700K, 3000K, 3500K, 4000K, 4500K and 5000K respectively to fit the general lighting requirements.

In the content as described above, this disclosure can be applied to any passive light board 10 which is not powered by electricity before, so that after the display condition is pre-written into the microcontroller 101 of the passive light board 10, and then the driver and LED component are installed to the passive light board 10 synchronously or the passive light board 10 is a structure installed with the first LED circuit 103 having a plurality of first LEDs 1031 and the second LED circuit 104 having a plurality of second LEDs 1041, and the first LEDs 1031 and the second LEDs 1041 have different light colors, and the first LEDs 1031 and the second LEDs 1041 are arranged in series respectively, and the control application program 11 performs a pre-written setting of the display condition to the passive light board 10 before the driver is installed. The technical characteristics of the control system are substantially the same as those described in the control method, and thus will not be repeated.

In summation of the description above, the method and system for controlling a display condition which is pre-written into a passive light board by a mobile device in accordance with the present disclosure can pre-write the display condition to the passive light board which has not been powered by electricity before through the mobile device, and after the driver is installed and electrically conducted, the light will be emitted according to the display condition. During the selection process, the backlight source of the mobile device changes its brightness and color temperature status synchronously according to the user's selection, so as to achieve the effects of previewing the luminous state by using the mobile device, and allowing the users to quickly and accurately select the required display condition for lighting. Compared with the prior art that can perform the lighting display control of a powered-on lamp only, the present disclosure provides a novel method to pre-write a control mode into a light board which is not powered by electricity before. Obviously, this disclosure has the advantages of convenient setting and simplified operation for users, and also combines the backlight source of the mobile device for previewing the luminous state to further improve the accuracy of the setting and allowing the users to have better application experience. Regardless of end-users, interior decoration lamp installers, and lamp manufacturers, the control method and system of the present disclosure can perform the pre-setting quickly and easily by the mobile device. To meet different application requirements and provide a more intuitive and simpler setting control, the control method and system also have the technical characteristics as described above. For example, it is only necessary to set any one of the passive light boards in an application of using a plurality of passive light boards, and after the passive light boards are powered on, they are telecommunicatively coupled and synchronized with the same display condition for the lighting operation, or the first operational gesture or the second operational gesture are an up-and-down slide or a left-and-right slide respectively, so as to facilitate users to set the brightness parameter and the color temperature parameter; or the control application program is built-in with a plurality of brightness options and color temperature options provided for the users to quickly select the desired display condition.

What is claimed is:

1. A method for controlling a display condition which is pre-written into a passive light board by a mobile device, comprising the steps of:
    providing at least one passive light board, wherein the passive light board comprises a microcontroller, a communication unit, a first LED circuit and a second LED circuit, and the microcontroller and the communication unit are electrically coupled to each other;
    starting a control application program loaded into the mobile device;
    inputting a brightness parameter from a display interface of the control application program, wherein the brightness parameter is obtained from a selection of a first operational gesture received by the control application program, and the mobile device has a backlight source synchronously changing a display brightness with the first operational gesture through a backlight source adjustment unit of the control application program, and stays at the display brightness corresponding to the brightness parameter after the brightness parameter is selected;
    inputting a color temperature parameter by the control application program, wherein the color temperature parameter is obtained from a selection of a second operational gesture received by the control application program, and the backlight source of the mobile device displays and changes a color temperature, according to the second operational gesture synchronously through the backlight source adjustment unit of the control application program, and stays at the color temperature corresponding to the color temperature parameter after the color temperature parameter is selected; and
    placing the mobile device near the passive light board, so that the mobile device and the communication unit form a near field communication connection to pre-write the brightness parameter and the color temperature parameter into the microcontroller; so as to performing a display status pre-writing to the passive light board which has not been powered on, and after the passive light board has installed a driver electrically coupled to the microcontroller, the first LED circuit and the second LED circuit, the microcontroller reads and computes the brightness parameter and the color temperature parameter to generate an execution instruction, and then sends the execution instruction to the driver, so that the driver drives the first LED circuit and the second LED circuit according to the execution instruction to let the passive light board display in compliance with the brightness parameter and the color temperature parameter.

2. The method as claimed in claim 1, wherein the first operational gesture is an up-and-down slide and the second operational gesture is a left-and-right slide; or the first operational gesture is a left-and-right slide and the second operational gesture is an up-and-down slide.

3. The method as claimed in claim 2, wherein the control application program sets a plurality of brightness options and a plurality of color temperature options provided for a user to select any one of the brightness options and any one of the color temperature options by the first operational gesture and the second operational gesture respectively, so that the control application program obtains the brightness parameter and the color temperature parameter.

4. The method as claimed in claim 3, wherein after the brightness parameter and the color temperature parameter are pre-written into the microcontroller, the mobile device issues a vibration alert or a sound alert.

5. The method as claimed in claim 4, wherein the display interface synchronously displays any one of the brightness options and any one of the color temperature options, and if a user applies the first operational gesture and the second operational sliding gesture on the display interface, the brightness option and the color temperature option will be switched accordingly.

6. The method as claimed in claim 5, wherein when there is a plurality of passive light boards, the communication units of the passive light boards are telecommunicatively coupled to each other, so that after any one of the passive light boards is pre-written with the brightness parameter and the color temperature parameter, the brightness parameter and the color temperature parameter are sent to the microcontrollers of the remaining passive light boards synchronously by the communication unit.

7. The method as claimed in claim 6, wherein the first LED circuit has a plurality of first LEDs, and the second LED circuit has a plurality of second LEDs, and the first LEDs and the second LEDs have different light colors, and the first LEDs and the second LEDs are arranged in series respectively.

8. The method as claimed in claim 7, wherein the brightness options are 25%, 50%, 75%, and 100% respectively.

9. The method as claimed in claim 8, wherein the color temperature options are 2700K, 3000K, 3500K, 4000K, 4500K and 5000K respectively.

10. A system for controlling a display condition which is pre-written into a passive light board by a mobile device, comprising:
    at least one passive light board, having a microcontroller, a communication unit, a first LED circuit and a second LED circuit, and the microcontroller and the communication unit being electrically coupled to each other; and
    a control application program, loaded into the mobile device, and comprising a display interface and a backlight source adjustment unit telecommunicatively coupled to each other, and the display interface being provided for a user to input a brightness parameter and a color temperature parameter to the control application program, wherein the brightness parameter is obtained from a selection of a first operational gesture received by the control application program, and a display brightness of a backlight source of the mobile device synchronously changes according to the first operational gesture through the backlight source adjustment unit, and stays at the display brightness corresponding to the brightness parameter after the brightness parameter is selected; the color temperature parameter is obtained from a selection of a second operational gesture received by the control application program, and a backlight source of the mobile device synchronously changes a color temperature through the backlight source adjustment unit and stays at the color temperature corresponding to the color temperature parameter after the color temperature parameter is selected; and when the mobile device is near the passive light board, the mobile device and the communication unit form a near field communication connection in order to pre-write the brightness parameter and the color temperature parameter into the microcontroller;

thereby, the passive light board which is not powered by electricity before carries out the pre-writing of the display status, and after the passive light board is installed with a driver electrically coupled to the microcontroller, the first LED circuit and the second LED circuit, the microcontroller reads and computes the brightness parameter and the color temperature parameter to generate an execution instruction, and then sends the execution instruction to the driver, so that the driver drives the first LED circuit and the second LED circuit according to the execution instruction to let the passive light board display in compliance with the brightness parameter and the color temperature parameter.

11. The system as claimed in claim 10, wherein the first operational gesture is an up-and-down slide and the second operational gesture is a left-and-right slide; or the first operational gesture is a left-and-right slide and the second operational gesture is an up-and-down slide.

12. The system as claimed in claim 11, wherein the control application program comprises a storage unit for storing a plurality of brightness options and a plurality of color temperature options provided for a user to select any one of the brightness options and any one of the color temperature options by the first operational gesture and the second operational gesture respectively, so that the control application program obtains the brightness parameter and the color temperature parameter.

13. The system as claimed in claim 12, wherein the control application program comprises an alert unit telecommunicatively coupled to the communication unit, and after the brightness parameter and the color temperature parameter are pre-written into the microcontroller, the mobile device is driven to generate a vibration alert or a sound alert.

14. The system as claimed in claim 13, wherein the display interface synchronously displays any one of the brightness options and any one of the color temperature options, and if a user applies the first operational gesture and the second operational sliding gesture, the brightness option and the color temperature option will be switched accordingly.

15. The system as claimed in claim 14, wherein when there is a plurality of passive light boards, the communication units of the passive light boards are telecommunicatively coupled to each other, so that after any one of the passive light boards is pre-written with the brightness parameter and the color temperature parameter, the brightness parameter and the color temperature parameter are sent to the microcontrollers of the remaining passive light boards synchronously by the communication unit.

16. The system as claimed in claim 15, wherein the first LED circuit has a plurality of first LEDs, and the second LED circuit has a plurality of second LEDs, and the first LEDs and the second LEDs have different light colors, and the first LEDs and the second LEDs are arranged in series respectively.

17. The system as claimed in claim 16, wherein the brightness options are 25%, 50%, 75% and 100% respectively.

18. The system as claimed in claim 17, wherein the color temperature options are 2700K, 3000K, 3500K, 4000K, 4500K and 5000K respectively.

* * * * *